United States Patent [19]
Poindexter

[11] Patent Number: 5,398,517
[45] Date of Patent: Mar. 21, 1995

[54] POTABLE WATER COLLECTION COIL CLEANING APPARATUS

[76] Inventor: Forrest R. Poindexter, 7729 Jewelweed Ct., Springfield, Va. 22152

[21] Appl. No.: 226,087

[22] Filed: Apr. 11, 1994

Related U.S. Application Data

[63] Continuation-in-part of Ser. No. 16,455, Feb. 11, 1993, Pat. No. 5,301,516.

[51] Int. Cl.⁶ .................................................. F25B 49/00
[52] U.S. Cl. .......................................... 62/125; 62/285; 62/303; 62/272; 165/95
[58] Field of Search ................. 62/272, 285, 288, 303, 62/125, 126, 129; 165/95

[56] References Cited

U.S. PATENT DOCUMENTS 4,742,691  5/1988  Kennedy ................ 62/272
5,186,240  2/1993  Kennon et al. ......... 165/95

*Primary Examiner*—John M. Sollecito
*Attorney, Agent, or Firm*—Rodger H. Flagg

[57] ABSTRACT

A cleaning apparatus is contained within the potable water collection apparatus, to selectively clean the cooling coil and the collection pan, when the collection apparatus is not collecting potable water. The potable water collection apparatus comprises an enclosure having an air mover to provide a dynamic airflow path between an inlet port and an outlet port; a compressor; a condensing coil in fluid communication with the compressor; a cooling coil in fluid communication with the condensing coil, thus forming a closed loop circulation system for the circulation of a refrigerant fluid. The cooling coil is in the dynamic airflow path. A collection tray is disposed below the cooling coil, and a collection container receives collected water from the collection tray. The cleaning apparatus comprises a hood enclosure for substantially enclosing the cooling coil and the inner surface of the collection tray. The hood enclosure is movable between a first closed cleaning position and a second opened position. The cleaning apparatus further comprises a cleaning fluid supply source and a rinsing fluid supply source; a valve in communication with the cleaning supply source and the rinsing supply source; a pump in communication with the valve, and a fluid dispersing apparatus; and a timing control device to selectively actuate the pump and the valve during the cleaning cycle.

20 Claims, 3 Drawing Sheets

POTABLE WATER COLLECTION COIL CLEANING APPARATUS

This invention is a continuation-in-part of U.S. application Ser. No. 08/016,455, filed Feb. 11, 1993, which issues as U.S. Pat. No. 5,301,516 on Apr. 12, 1994, and is incorporated by reference herein.

BACKGROUND OF THE INVENTION

1. Field of the Invention

This invention relates to an improved cleaning apparatus for a dehumidification system for transforming water vapor from the atmosphere into potable water suitable for drinking, and more particularly for a cleaning apparatus to obtain and maintain drinking quality water from the atmosphere by condensation, as dynamic airflow is drawn from an inlet port, across a plurality of cooling coils to an outlet port, while a fluid refrigerant is circulated by a compressor through the cooling coils and the condenser coils, in a closed loop circulation system.

Due to the temperature differential between the passing air and the cooling coils, liquid condensation gathers on the outside of the cooling coils, where the condensation forms water droplets. These droplets flow by gravity from the cooling coils into a water collection pan positioned beneath the coils, and is collected into a suitable container located beneath the collection pan.

This invention is directed to apparatus for periodically cleaning the water collection area of the potable water collection system, to maintain drinkable quality potable water over extended periods of time.

2. Description of the Prior Art

Prior art devices have attempted to supply potable drinking quality water collected from the atmosphere, by treating the water after collection to provide drinking quality water. Where the water collection surfaces become contaminated, much effort must be expended to clean the water contaminated by the collection surfaces. Attempts have been made to filter the contaminated water, and to irradiate the contaminated water with various types of rays, such as ultraviolet rays, etc. These solutions are expensive, and only partially successful.

This inventor believes that the best solution is to maintain a clean collection environment, so that the collected water is not contaminated by the collection equipment. To this end, this apparatus provides for systematic cleaning of the collection surfaces, to avoid contamination of the collected water. This systematic cleaning is made easier by isolating the environment in which the potable water is collected, and by automating the cleaning process.

SUMMARY OF THE INVENTION

Applicant's invention discloses an improved potable water collection cleaning apparatus. The potable water collection apparatus is contained in an enclosure, with at least one access opening, and inlet and outlet ports. A dynamic airflow path is created between the inlet and outlet ports. A compressor is preferably secured within the collection apparatus. Condensing coils are in fluid communication with the compressor; and cooling coils are in fluid communication with the condensing coils, thus forming a closed loop circulation system therebetween. The cooling coils are located in the dynamic airflow path passing between the inlet port and the outlet port. An inlet air filter is preferably located in the path of the dynamic airflow in proximity to the inlet port.

A suitable refrigerant fluid is circulated in a closed loop circulation system between the compressor, the condenser coils, and the cooling coils. During circulation of the refrigerant fluid through the closed loop circulation system, condensation forms on the outside of the cooling coils, as the dynamic airflow passes over the cooling coils.

A water collection tray is located beneath the cooling coils to collect the condensation in the form of a plurality of water droplets as they flow by gravity from the cooling coils. A drain aperture in the collection pan directs the water into a potable water collection container having an inlet opening in fluid communication with the drain aperture.

The water collection container is removable from the enclosure through an access opening, which may include a closure member to selectively cover the access opening during operation of the potable water collection apparatus.

A cleaning access port is provided to access the cooling coils and the water collection pan, for ease of cleaning. Access to the cooling coils and the water collection pan through the cleaning access port is provided to enable the user to properly clean all parts of the apparatus in contact with the collected water, including the outer surface of the cooling coils, and the inner surface of the water collection tray, to ensure that the water collected is fit to drink. This potable water collection apparatus may be manually cleaned, as noted in the prior application referenced above, or may be systematically mechanically and chemically cleaned with the cleaning apparatus disclosed herein.

The cleaning apparatus comprises a hood enclosure to selectively enclose the cooling coils and the inner surface of the collection pan, when in a first closed cleaning position, and the hood enclosure is selectively positioned in a second open water collection position which does not substantially interfere with the dynamic airflow passing over the cooling coils, during operation of the portable water collection apparatus.

A suitable fluid dispensing means, such as a spray nozzle, is disposed within the hood enclosure when the hood enclosure is in the first closed position. The fluid dispensing means is positioned to selectively dispense a cleaning fluid and then a rinsing fluid about the cooling coils and the inner surface of the collection pan, in order to systematically sanitize and sterilize the water collection apparatus.

A cleaning fluid supply means and a rinsing fluid supply means are in fluid communication with the fluid dispensing means. A fluid control means, selectively disperses the cleaning fluid and the rinsing fluid through the fluid dispensing means during a selected period when the potable water collection apparatus is not operating.

A fluid disposal means, such as a remote drain, or a portable disposal container, are positioned to receive the discharged cleaning and rinsing fluid, prior to resuming the collection of the potable drinking water from the surrounding atmosphere.

The fluid control means preferably includes a pump having inlet and outlet ports, a valve means, and a timing control means.

The above mentioned and other features and objects of the invention, and the manner of attaining them will be best understood by reference to the following description of an embodiment of the invention, when considered in conjunction with the accompanying drawings:

DETAILED DESCRIPTION OF THE INVENTION

Figures 1A, 1B:
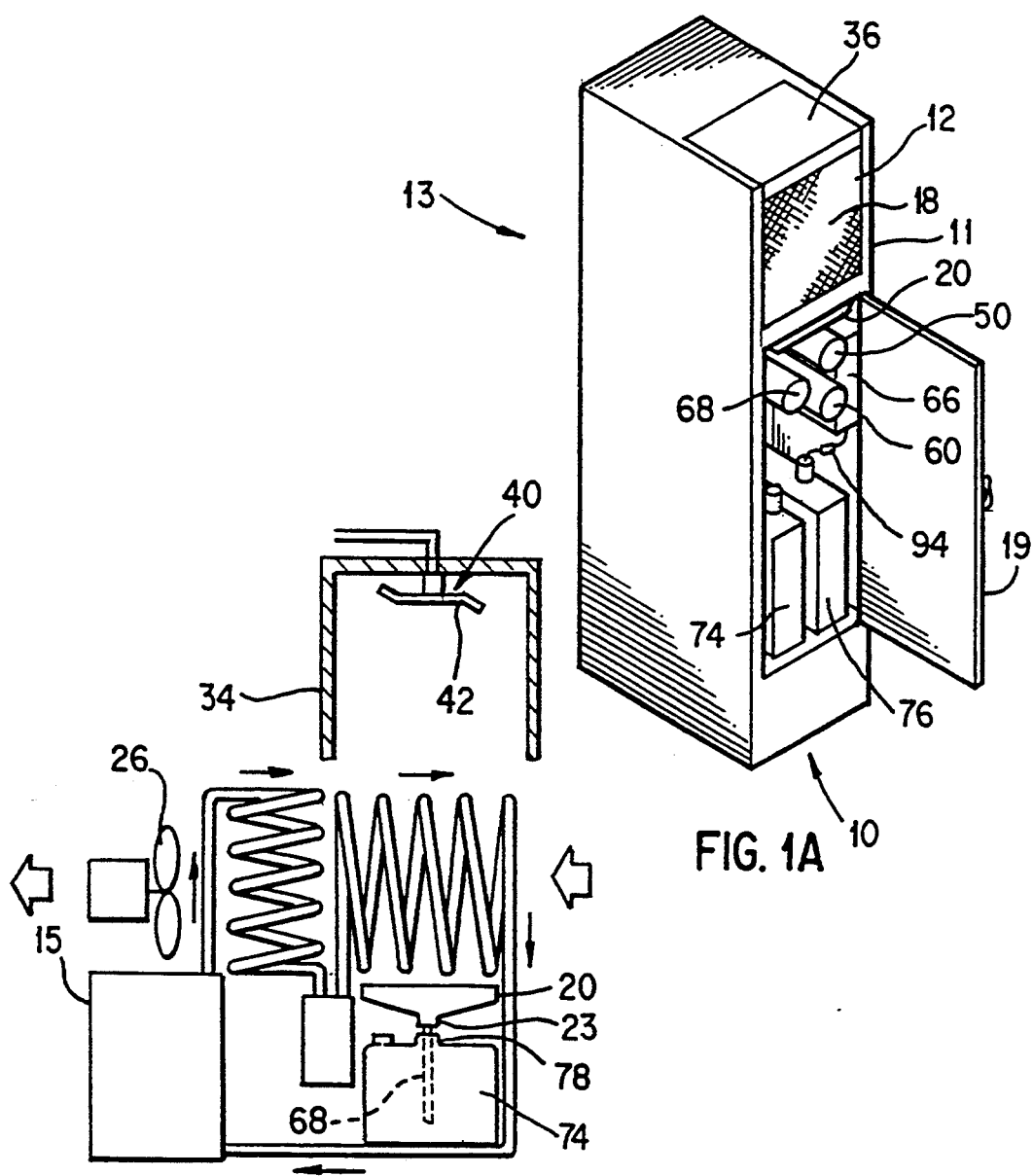
FIG. 1A is a perspective view of the potable water collecting apparatus, showing the enclosure.
FIG. 1B is a diametric view of the potable water collecting apparatus, showing the major component parts.

The subject matter which I regard as my invention is particularly pointed out and distinctly claimed in the claims. The structure and operation of my invention, together with further objects and advantages, may be better understood from the following description given in connection with the accompanying drawings, in which:

FIG. 1A and 1B show the potable water collection apparatus 10, having an enclosure 11 with an inlet port 12, and an outlet port 13. A dynamic airflow path extends between the inlet port 12 and the outlet port 13.

Cooling coils 14 are disposed within the enclosure 11, in the dynamic airflow path passing between the inlet port 12 and the outlet port 13. The cooling coils 14 are in fluid communication with a compressor 15 which circulates a refrigerant fluid (not shown) between a compressor 15, condensing coils 17 and cooling coils 14, forming a closed loop circulation system through which the refrigerant fluid is circulated during operation of the potable water collecting apparatus 10.

Suitable inlet and outlet filters 18 may be used in the dynamic airflow to filter airborne contaminates, such as pollen or house dust, which may be present in the air. Such air filters 18 are well known in the art, and thus not further discussed herein.

Figure 2A:
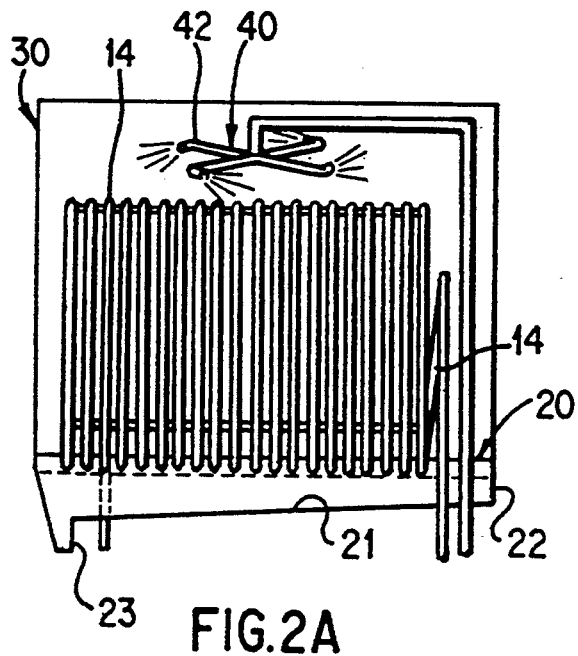
FIG. 2A is a side sectional view of the hood enclosure, showing the fluid dispersing means, in the form of at least one rotating spray nozzle, located above the cooling coils.
Figure 2B:
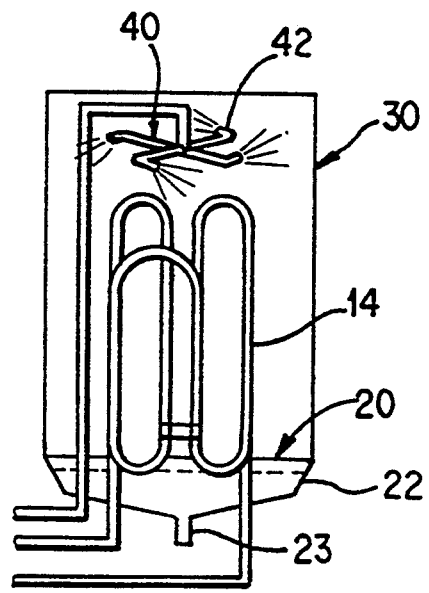
FIG. 2B is an end sectional view of the hood enclosure, shown in FIG. 2A.
Figure 3A:
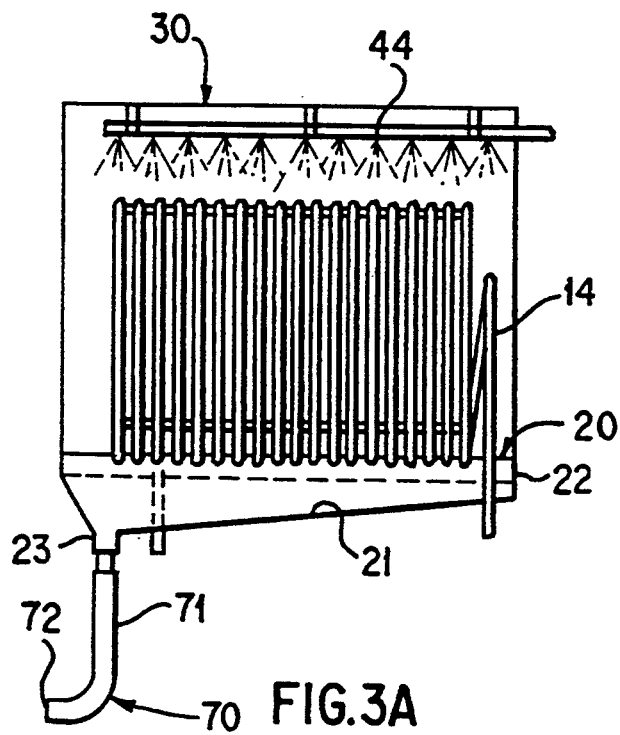
FIG. 3A is a side sectional view of the hood enclosure, showing the fluid dispersing means, in the form of a plurality of spray nozzles located above the cooling coils.
Figure 3B:
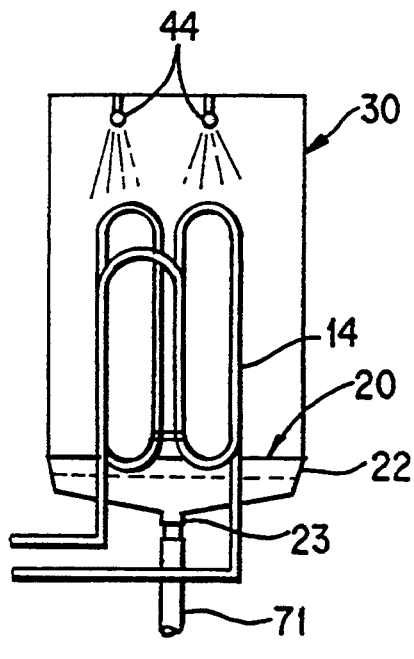
FIG. 3B is an end sectional view of the hood enclosure, shown in FIG. 3A.

As best shown in FIG. 2A and 2B, and again in FIG. 3A and 3B, a collection tray 20, having an inclined inner portion 21, with raised sides 22, is located beneath the cooling coils 14, to receive condensation in the form of water droplets, which collect on the outside of the cooling coils 14. The water droplets flow by gravity into the collection tray 20. At least one drain aperture 23 in communication with the inclined inner portion 21 of the collection tray 20, serves to funnel the collected water from the collection tray 20 through a suitable filter 68 into a suitable collection container 76 having an inlet opening 78 in fluid communication with the drain aperture 23 in the collection tray 20.

The cooling coils 14 and the collection pan 20 are preferably made of stainless steel, to minimize corrosion and for ease of cleaning.

A hood enclosure 30 is positioned in a first closed position 32, as shown in FIG. 2A and 3A, in preparation for cleaning the cooling coils 14 and the inner surface portion 21 of the cooling tray 20. The hood enclosure 30 isolates the cooling coils 14 and the inner surface of the collection tray 20, from the rest of the potable water collection apparatus 10 for ease of cleaning. With the hood enclosure 30 in a first closed position 32, the cleaning fluid 52 and rinsing fluid 62 may be isolated to all those areas of the apparatus 10 which are in direct contact with the condensation and collection of potable drinking quality water.

The hood enclosure 30 is preferably at least partially transparent, to enable the user to visually observe at least a portion of the cleaning cycle, while the hood enclosure is in the first closed position 32.

Various types of cleaning fluids 52, such as chemicals, disinfectants, and sanitizers may be used to clean those areas in direct contact with the potable water. For example, chlorine based sanitizers, such as one hundred to two hundred ppm of available chlorine from a chemical compound such as NaOCl (sodium hypochlorite), may be used. Iodine based sanitizers, detergent-iodine sanitizers, acid sanitizers, etc. may also be used. All such suitable cleaning chemicals, disinfectants and sanitizers known in the art may be used, and such use is intended to fall within the scope of this disclosure.

Various rinsing fluids 62, such as water, may be used following the use of cleaning fluid 52, to rinse any chemical residue from the surfaces of the cooling coils 14 or the collection tray 20.

As shown in FIG. 2A and 2B, a fluid dispersing means 40, such as a rotating spray nozzle 42, similar to rotating spray nozzles 42 found on lawn sprinklers, dish washing machines, etc., serves to disperse the cleaning fluid 52 and the rinsing fluid 62 during the cleaning cycle. The fluid dispersing means 40 may be located above the cooling coils 14, between the cooling coils 14, beside the cooling coils 14 or beneath the cooling coils 14, to suit design preference and space considerations.

One or more fluid dispersing means 40 may be used to provide adequate coverage of the areas to be cleaned and rinsed. The fluid dispersing means 40 is positioned within the hood enclosure 30 when the hood enclosure 30 is in the first closed position 32, to ensure that the cleaning and rinsing fluids 52, 62 adequately reach all the areas to be cleaned and rinsed.

As shown in FIG. 3A and 3B, the fluid dispersing means 40 may alternately comprise a plurality of spray nozzles 44 in fluid communication with the fluid cleaning supply means 50 and the fluid rinsing supply means 60. The plurality of spray nozzles 44 may be positioned either above the cooling coils 14, beside the cooling coils 14, below the cooling coils 14, or between the cooling coils 14, and are positioned within the hood enclosure 30, when the hood enclosure 30 is in the first closed position, to ensure that the cleaning and rinsing fluids 52, 62 adequately reach the areas to be cleaned and rinsed.

The fluid dispersing means 40 may be attached directly to the inside of the hood enclosure 30, or may extend within the hood enclosure 30 to suit manufacturing preference.

Upon completion of the cleaning cycle, the hood enclosure 30 is mechanically or manually moved from the first closed position 32 in proximity to the cooling coils 14, to a second open position 34 to provide a substantially unrestricted dynamic airflow path over the cooling coils 14, between the inlet port 12 and the outlet port 13 during potable water collection.

A cleaning fluid supply means 50 selectively supplies cleaning fluid 52 from a suitable container 54. Likewise, a rinsing fluid supply means 60 selectively supplies rinsing fluid 62 from a suitable container 64. The cleaning fluid may be in the form of a suitable commercially available liquid, gaseous or atomized spray. The rinsing fluid may be in the form of a suitable commercially available liquid, such as water, or a commercially available gaseous spray, such as air. The cleaning fluid 52 and/or the rinsing fluid 62 may be heated prior to use. The fluid cleaning supply means 50 container 54 and the fluid rinsing supply means 60 container 64 are preferably releasably secured to a rack 66 mounted to one of the sides of the enclosure 11. In this way, the rack 66 may be easily inserted into the potable water collection apparatus 10 prior to cleaning, or removed from the apparatus following cleaning.

The fluid disposal means 70 may comprise a hose, pipe or other fluid connection means 71 which is connected to a suitable remote fluid drain 72. (See FIG. 3A.)

Figure 4:
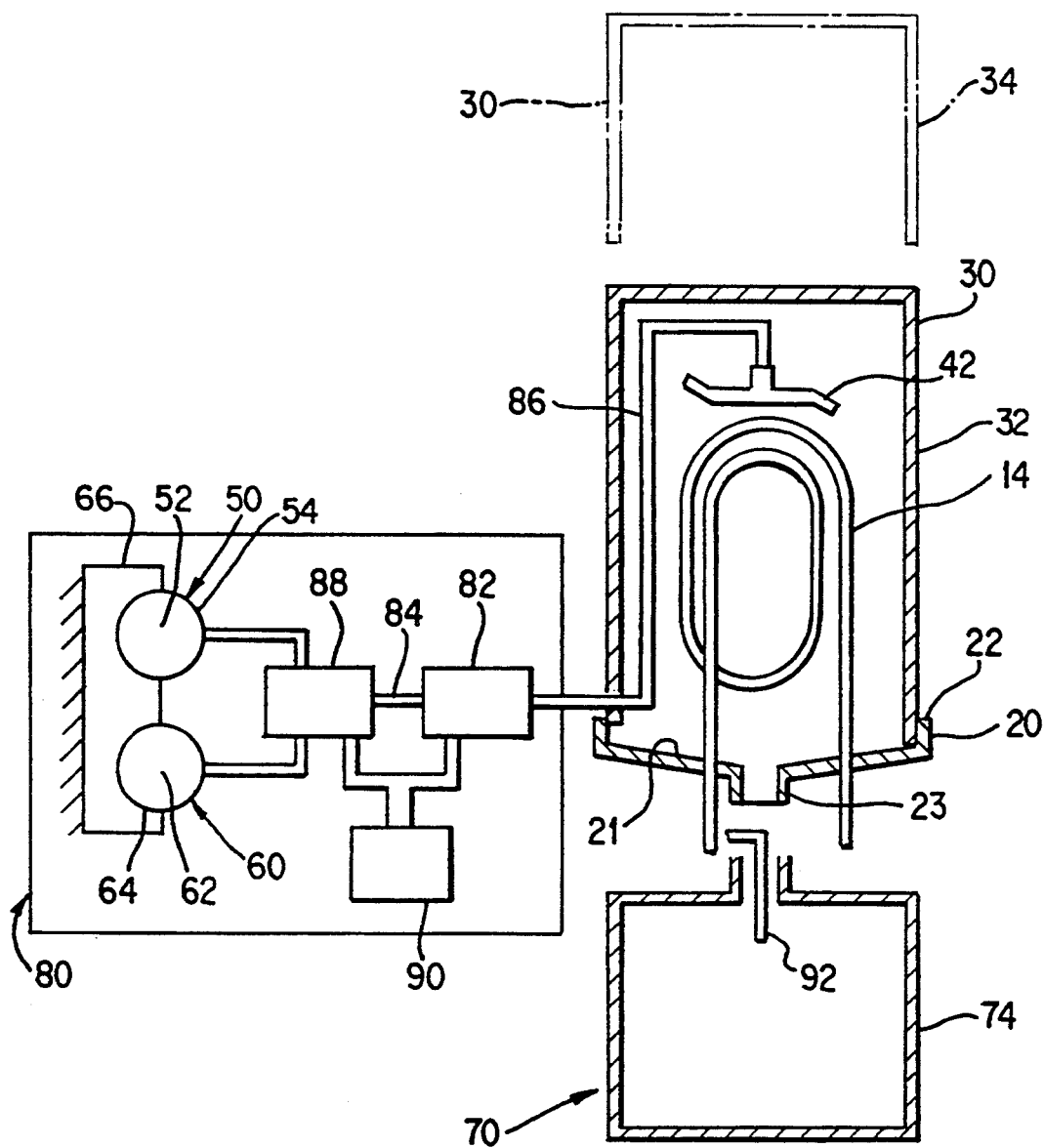
FIG. 4 is a diagram showing the relationship of the fluid control means to the fluid dispersing means, and to the cleaning and rinsing fluid supply means.

Alternately, a suitable portable disposal container 74 may be positioned to receive the used cleaning fluid 52 and rinsing fluid 62, for subsequent disposal. (See FIG. 4.)

The cleaning fluid 52 and rinsing fluid 62 are each selectively supplied to the fluid dispersing means 40 by a fluid control means 80. Preferably, the fluid control means 80 comprises a pump 82, having an inlet port 84 and an outlet port 86. The inlet port 84 of the pump 82 is connected to a suitable valve means 88, which acts to selectively supply the cleaning fluid 52 from the cleaning fluid supply means 50, or the rinsing fluid 62 from the rinsing fluid supply means 60, to the pump 82.

The outlet port 86 of the pump 82 is connected to the fluid dispersing means 40. A suitable timing means 90, provides selective control of the operation of the valve means 88 and the pump 82, and is preferably adjustably controlled to ensure an adequate duration of the cleaning and rinsing of the cooling coils 14 and the inner surface portion 21 of the collection tray 20.

Where a portable disposal container 74 is used to collect the used cleaning fluid 52 and the used rinsing fluid 62, a liquid level sensor 92 may be used to control the filling of the portable container to avoid overfilling. The liquid level sensor will not be needed, where the fluid disposal means 70 comprises a fluid connection to a remote fluid drain 72.

OPERATION OF THE INVENTION

In operation, The hood enclosure 30 is selectively moved to a first closed position 32 to isolate the cooling coils 14 and the inner surface portion of the collection tray 20, for ease of cleaning, when the potable water collection apparatus 10 is not in operation. The hood enclosure 30 is selectively moved to a second open position 34 during operation of the potable water collection apparatus 10, to provide a substantially unrestricted dynamic airflow path across the cooling coils 14, positioned between the inlet port 12 and the outlet port 13.

A liquid level sensor 92 may be used to stop the timing control means 90, when the liquid level in the portable disposal container 74 has reached a suitable height to avoid the danger of overfilling. Numerous devices are known in the art to be responsive to the water level in a portable container 54. One such device is a microswitch. Another device is a capacitive proximity sensor. Yet another device is a pressure sensor, which may be actuated by the weight of the portable disposal container 74 as it is filled with cleaning fluid 52 and rinsing fluid 62. Another device is a bipolar contact sensor. Yet another is a float sensor, in direct contact with the liquid in the portable container 74, etc. The liquid level sensor 92 may be adapted to signal the fluid control means 80 to stop the pump 82 when the portable container 74 is filled to the desired capacity. A quick release electrical connection 94 may be used for ease of removal and installation of the liquid level sensor 92 between the portable container 74 and the fluid control means 80.

Any suitable device known in the art may be used to control the liquid level in the portable disposal container 74 by selectively shutting off the fluid control means 80 when the portable container 74 is filled to a desired level.

The potable water collection apparatus 10, may be located within a home, business, or other indoor or outdoor setting, where potable water may be used and/or collected. The potable water collection apparatus 10 will supply more than a gallon of water during 8 hours use, for less than the cost in electricity of bottled water. The periodic cleaning of the potable water collection apparatus 10 as disclosed herein, ensures a continued supply of drinking quality water, over a prolonged period of use. The periodic cleaning may be accomplished upon the collection of a pre-determined amount of potable water, or may be actuated after a pre-determined number of hours, or daily, weekly or monthly to suit the frequency of use, and the needs of the user. This potable water collection apparatus 10 and cleaning apparatus 1, may be scaled up to supply larger quantities of potable drinking quality water, with resultant pre-determined cleaning cycles, as needed or desired, without departing from the scope of this disclosure or these claims.

The potable water collection apparatus 10 is plugged into a suitable power supply, such as an electrical power supply, to selectively actuate the potable collection apparatus 10 and the cleaning apparatus 1. Any power supply means may be used, such as solar power, gas, compressed air, hydrogen power, steam, etc. without departing from the spirit or scope of the invention.

A suitable fan 26 is actuated to create a dynamic airflow path, which extends between the inlet port 12 and the outlet port 13. A suitable filter 18, is positioned adjacent to the inlet port, to filter the air passing into the potable water collection apparatus 10. The dynamic airflow passes across the cooling coils 14, to exit through the outlet port 13.

A compressor 15, circulates refrigerant through the inner surface the condensing coils 17 and the cooling coils 14. The cooling coils 14 serve to cool the dynamic airflow flowing past the outside surface of the cooling coils 14, drawing moisture from the passing air in the form of condensation. The condensation forms water droplets, which fall by gravity from the outside of the cooling coils 14, into the collection tray 20. The collected water flows along the inner surface portion 21 of the collection tray 20, through the drain aperture 23, to a collection container 76.

A liquid level sensor 92 is preferably used, to shut off the compressor 15 when the liquid level in the water collection container 80 has reached a desired level. This eliminates the need to check the apparatus 10 repeatably to avoid excess water which may overflow the collection container 76.

The cooling coils 14 and the inner surface portion 21 of the collection tray 20 come in direct contact with the water droplets formed by condensation, and thus must be routinely cleaned to avoid contamination of the potable water.

The potable water collection cleaning apparatus 1 disclosed herein, may be adapted to position the hood enclosure 30 in a first closed position 32, then cycle cleaning fluid 52 and rinsing fluid 62 through the fluid dispersing means 40 for a predetermined period of time, then direct the used cleaning fluid 52 and rinsing fluid to a suitable fluid drain 72, or portable collection disposal container 76. Upon completion of each cleaning cycle, the hood enclosure 30 is manually or mechanically raised to a second open position 34, in preparation for the next potable water collection cycle.

An access panel 19 may be provided in enclosure 11 for ease of insertion and removal of the water collection container 76 and/or the portable fluid disposal container 74.

Cleaning of the apparatus in contact with the water droplets, such as the outer surface of the cooling coils 14 and the inner surface of the collection tray 20 may be accomplished by application of suitable cleaning fluids or disinfectants, etc. A solution of one hundred to two hundred parts per million of available chlorine, from a chemical compound such as NaOCl (sodium hypochlorite), may be used. The cleaning solution may be applied by spraying the cleaning fluid 52 through the fluid dispersing means 40, then rinsing the cleaning fluid 52 away from the cooling coils 14, and the inner surface of the collection tray 20 with a suitable rinsing fluid 62, such as water.

The hood enclosure 30 is designed to be moved into a second open position 34 which does not substantially reduce the dynamic airflow passing between the inlet port 12 and the outlet port 13 of the potable collection apparatus 10. Preferably, the hood enclosure 30 is at least partially transparent, to aid the user in visually observing at least a portion of the cleaning cycle.

Thus, while the novel potable water collection cleaning apparatus 1 has been fully disclosed and described herein, numerous modifications will become readily apparent to one of ordinary skill in this art, and such adaptations and modifications are intended to be included within the scope of the following claims.

I claim:

1. A potable water collection cleaning apparatus having a selected cleaning cycle, comprising:
   a) a selectively positionable hood enclosure for enclosing a cooling coil of the potable water collection apparatus, the hood enclosure positioned in a first closed cleaning position adjacent to a collection pan located beneath the cooling coil, and the hood enclosure positioned in a second open water collection position to provide substantially unrestricted dynamic airflow across the cooling coils when the potable water collection apparatus is in operation;
   b) a fluid dispersing means disposed within the hood enclosure to selectively disperse a cleaning fluid, and then disperse a rinsing fluid about the cooling coils and an inner surface portion of the collection tray when the hood enclosure is positioned in the first closed cleaning position;
   c) a cleaning fluid supply means in fluid communication with the fluid dispersing means;
   d) a rinsing fluid supply means in fluid communication with the fluid dispersing means;
   e) a fluid collection means in fluid communication with a discharge nozzle on the collection pan; and
   f) a fluid control means to selectively supply the cleaning fluid and the rinsing fluid to the fluid dispersing means during a selected cleaning cycle.

2. The apparatus of claim 1, wherein a rack is positioned in proximity to the collection pan, and the cleaning fluid supply means and the rinsing fluid supply means are releasably secured to the rack.

3. The apparatus of claim 1, wherein the fluid dispersing means comprises at least one rotating spray nozzle.

4. The apparatus of claim 3, wherein the fluid dispersing means is positioned above the cooling coils.

5. The apparatus of claim 3, wherein the fluid dispersing means is positioned between the cooling coils.

6. The apparatus of claim 1, wherein the fluid dispersing means is a plurality of spray nozzles positioned within the hood enclosure.

7. The apparatus of claim 1, wherein the fluid control means comprises:
   a) a pump having an inlet in communication with the cleaning fluid means and the rinsing fluid means, the pump further having an outlet in communication with the fluid dispersing means;
   b) a valve means to selectively control access between the pump and the fluid cleaning means and the fluid rinsing means; and
   c) a timing means to control actuation of the cleaning cycle.

8. The apparatus of claim 1, wherein the fluid collection means is connected to a suitable remote fluid drain.

9. The apparatus of claim 1, wherein the fluid collection means is a portable disposal container.

10. The apparatus of claim 1, wherein the hood enclosure is at least partially transparent, to enable the user to visually observe at least a portion of the cleaning cycle.

11. A cleaning apparatus for a potable water collection apparatus having a cooling coil, and a collection tray with an inner surface and a drain aperture, the cleaning apparatus comprising:
   a) a selectively positionable hood enclosure for enclosing the cooling coil located on the potable water collection apparatus, the hood enclosure positioned in a first closed cleaning position adjacent to the collection tray located beneath the cooling coil, and the hood enclosure subsequently positioned in a second open water collection position to provide substantially unrestricted dynamic airflow across the cooling coils when the potable water collection apparatus is collecting potable water;
   b) a fluid disposal means in communication with the drain aperture on the collection tray;
   c) a fluid cleaning supply means and a fluid rinsing supply means;
   d) a valve means in liquid communication with the liquid cleaning supply means and the liquid rinsing supply means;
   e) a pump means in fluid communication with the liquid valve means;

f) a liquid dispersing means disposed within the hood enclosure when the hood enclosure is in the first closed cleaning position, the liquid dispersing means in fluid communication with the liquid pump means to selectively disperse a cleaning fluid and then disperse a rinsing fluid about the cooling coils and the inner surface portion of the collection tray; and g) a timing control means to control the actuation of the pump means and the selective actuation of the valve means, when the potable collection apparatus is not collecting potable drinking quality water.

12. The apparatus of claim 11, wherein the fluid dispersing means comprises at least one rotating spray nozzle.

13. The apparatus of claim 11, wherein the fluid dispersing means is positioned above the cooling coils.

14. The apparatus of claim 11, wherein the fluid dispersing means is positioned between the cooling coils.

15. The apparatus of claim 11, wherein the fluid dispersing means is a plurality of spray nozzles positioned within the hood enclosure, when the hood enclosure is located in its first closed position.

16. The apparatus of claim 11, wherein the hood enclosure is at least partially transparent, to enable the user to visually observe at least a portion of the cleaning cycle.

17. A potable water collection cleaning apparatus, comprising:

a) a potable water collection means having an enclosure with an inlet port and an outlet port, the enclosure further containing a dynamic airflow means for providing a dynamic airflow path between the inlet port and the outlet port; a fluid refrigerant compressor; a condenser coil in fluid communication with the compressor; a cooling coil in fluid communication with the condenser coil forming a closed-loop circulation system for the circulation of a refrigerant fluid therebetween, the cooling coil disposed in the dynamic airflow path between the inlet port and the outlet port; a collection tray having an inner surface with raised sides and at least one drain aperture; a potable water collection container in fluid communication with the drain aperture on the collection tray;

b) a cleaning apparatus, the cleaning apparatus comprising a selectively positionable hood enclosure for selectively enclosing the cooling coil, the hood enclosure movably positioned between a first closed cleaning position and a second open water collection position; a cleaning fluid supply means and a rinsing fluid supply means; a valve means in fluid communication with the cleaning fluid supply means and the rinsing fluid supply means, for selectively supplying one of the cleaning fluid supply means and the rinsing fluid supply means; a pump means in fluid communication with the valve means; a fluid dispersing means in fluid communication with the pump means, the fluid dispersing means disposed in proximity to the cooling coil beneath the hood enclosure when the hood enclosure is in the first closed position; and a timing control means for selectively actuating the potable water collection means and the cleaning means.

18. The apparatus of claim 17, wherein the fluid dispersing means comprises at least one rotating spray nozzle.

19. The apparatus of claim 17, wherein the fluid dispersing means comprises a plurality of spray nozzles positioned in proximity to the cooling coil.

20. The apparatus of claim 17, wherein the hood enclosure is at least partially transparent, to enable a user to visually observe at least a portion of the cleaning cycle.

* * * * *